Dec. 30, 1941.   G. G. GUTHRIE   2,268,031
CIRCUIT MAKER FOR TIRE DEFLATION SIGNALING DEVICES
Filed June 12, 1940   2 Sheets-Sheet 1
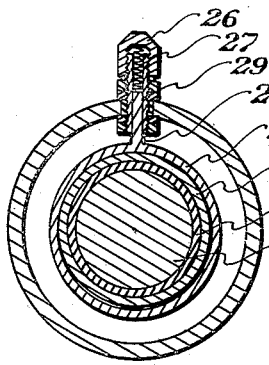
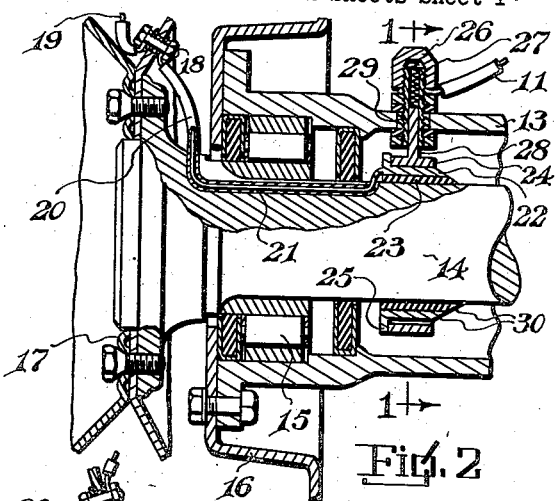
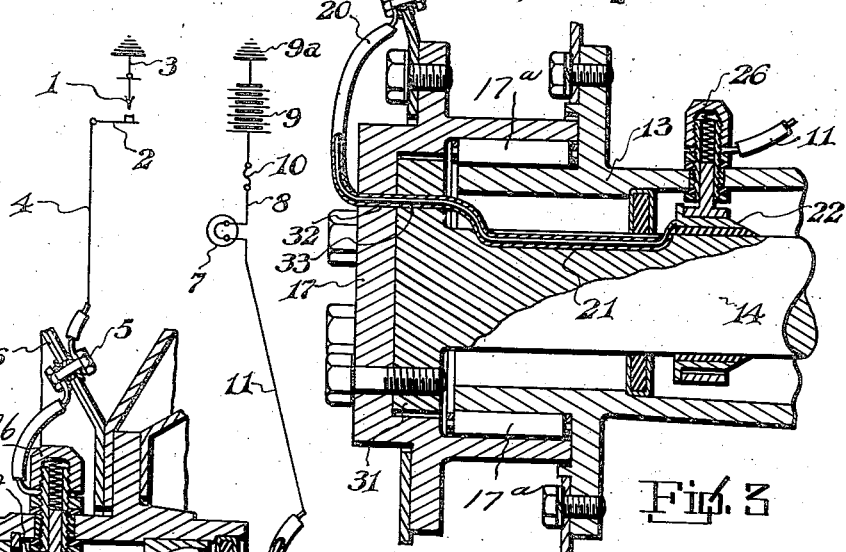
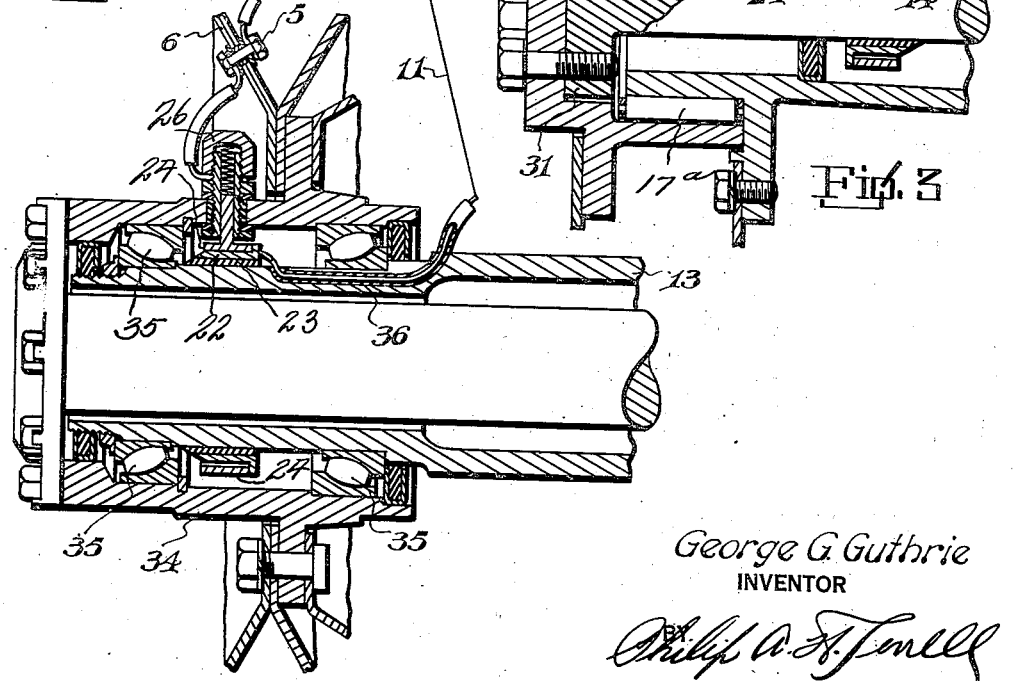
George G. Guthrie
INVENTOR
ATTORNEY Dec. 30, 1941.  G. G. GUTHRIE  2,268,031
CIRCUIT MAKER FOR TIRE DEFLATION SIGNALING DEVICES
Filed June 12, 1940  2 Sheets-Sheet 2
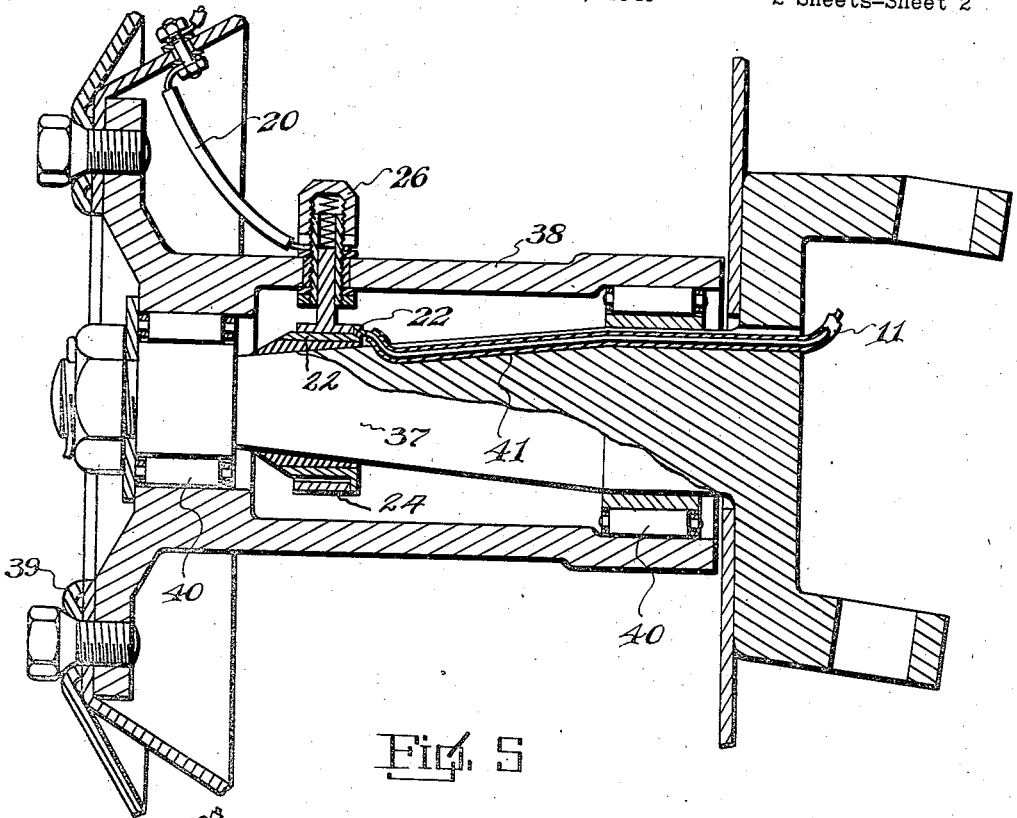
Fig. 5
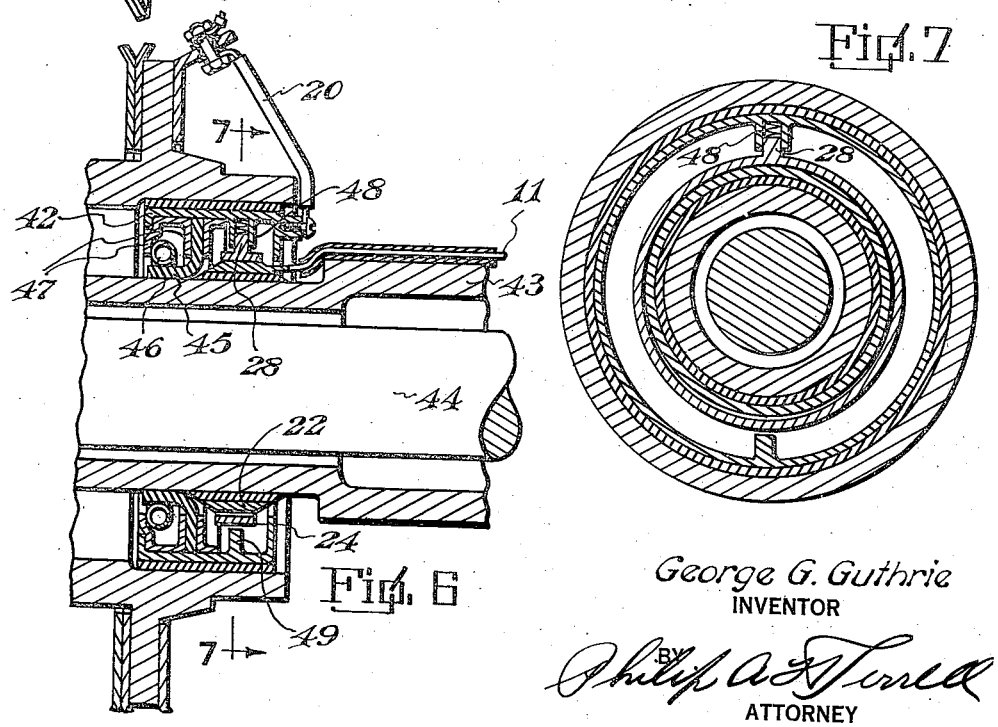
Fig. 6
Fig. 7
George G. Guthrie
INVENTOR
ATTORNEY Patented Dec. 30, 1941

2,268,031

UNITED STATES PATENT OFFICE 2,268,031

CIRCUIT MAKER FOR TIRE DEFLATION SIGNALING DEVICES

George G. Guthrie, Tulsa, Okla.

Application June 12, 1940, Serial No. 340,209

3 Claims. (Cl. 173—324)

The invention relates to circuit makers for tire deflation signaling devices, and has for its object to provide a stationary contact ring surrounding a conductor ring, which conductor ring rotates with a rotatable part of the wheel drive mechanism to maintain contact at all times between rotating parts.

A further object is to provide a circuit maintaining device for tire deflation signaling devices and comprising a conductor ring within a second conductor ring either of which rings may rotate in relation to the other for maintaining the circuit.

A further object is to provide the conductor ring which surrounds the other conductor ring with an arm radially slidable against spring action for positively maintaining contact between the rings as one rotates in relation to the other.

A further object is to form the interior diameter of the outer ring larger than the outer diameter of the inner ring so the outer ring may accommodate itself to irregularities, and at the same time allow the spring action to maintain a position, rather large, contact with the periphery of the inner conductor ring.

A further object is to provide the inner conductor ring, and the insulating ring therein, with a bevelled side for guiding the outer conductor ring into position during assembling of the device.

A further object is to provide one side of the inner conductor ring with a limit flange for engaging one side of the outer conductor ring and maintaining contact entirely around the ring.

A further object is to provide an annular casing in which the contact rings are mounted and a grease retainer therein as a complete unit so the device can be assembled as a unit. Also to provide a lug within the annular casing for holding the outer ring in position during the assembling operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a transverse sectional view through the circuit maker taken on line 1—1 of Figure 2.

Figure 2 is a vertical longitudinal sectional view through the rear wheel and brake drum structure of the Buick type showing the circuit maker applied thereto.

Figure 3 is a vertical longitudinal sectional view through the rear axle structure of a Ford type, showing the circuit maker adapted thereto.

Figure 4 is a view similar to Figure 3 showing the device modified for application to a Chevrolet structure.

Figure 5 is a vertical longitudinal sectional view through a front wheel structure and a stub axle of the Ford type, showing the device applied.

Figure 6 is a vertical longitudinal sectional view through a rear Chevrolet structure, showing the unit circuit maker applied thereto in connection with an oil retaining means.

Figure 7 is a vertical transverse sectional view taken on line 7—7 of Figure 6.

Referring to the drawings, the numeral 1 designates a conventional form of circuit maker and breaker adapted to be closed upon deflation of a tire through the closing of a circuit 2. The circuit maker and breaker 1 has one side connected to a ground wire 3, and the other side to a conductor wire 4 which leads to an insulated binding post 5 carried by the disc wheel 6 which rotates. Mounted on the dash of the vehicle, or in any other suitable position, is a signaling light 7, one side of the light being provided with a conductor wire 8 leading through a fuse 10 to a battery 9, which is grounded at 9a. The other side of the signaling light 7 is provided with a conductor wire 11, leading to a circuit maintainer hereinafter set forth. It is understood a complete circuit is maintained to the circuit maker and breaker 1 and this circuit is normally open until there is a deflation or partial deflation of a tire.

The circuit maker and breaker 1 is preferably of the type shown in my application No. 284,119, filed July 12, 1939, issued as Patent 2,205,168 on June 18, 1940, however it is to be understood that the present device is applicable to any type of circuit maker and breaker.

Referring to the drawing and particularly to Figures 1 and 2 wherein a rear wheel structure is shown of the Buick type, the numeral 13 designates the rear axle housing and 14 the driven rear axle therein. The rear axle 14 is mounted in a roller bearing 15 within the brake drum 16, and at the outer end of the driven shaft 14 is a wheel structure 17. The wheel 17 is provided with an insulated binding post 18 to which the conductor wire 19 is connected. Also connected to the binding post 18 is a conductor wire 20 which extends inwardly through a channel 21 in the periphery of the driven shaft 14 through the bearing 15 and is connected to the inner rotatable conductor ring 22 insulated from the shaft 14 by the sleeve 23. Surrounding the conductor ring 22 is an outer conductor ring 24 having an interior diameter greater than the outer diameter of the conductor ring 22 to allow transverse play of the conductor ring 24 for positively maintaining contact at all times and allowing for structural variations. The outer side of the conductor ring 22 is provided with an annular flange 25 which engages the outer side of the ring 24 and maintains a positive contact as the ring 22 is rotated with the drive shaft 14 and the wheel.

The casing 13 is provided with a binding post 26 insulated therefrom and to which the conductor wire 11 is connected. Disposed within the terminal connector is an expansion spring 27, the expansive action of which is on the shaft 28, slidably mounted in the bore 29 of the terminal connector and in the plane of the axis of the shaft 14.

Referring to Figure 1, it will be seen that the outer conductor ring 24 is stationary and it will have a relatively large surface engagement with the conductor ring 22 on its periphery and also with the limit flange which limits the inward movement of the conductor ring 23 during the assembling operation. The inner side of the insulation sleeve and the conductor ring 22 are bevelled as at 30 so the outer conductor ring 24 will be easily centered during the assembling operation. The above rear axle structure is of conventional Buick type.

Referring to Figure 3 wherein a rear axle structure of the Ford type is shown, the same numerals apply, however in this type the outer end of the axle 14 is provided with a head 31 to which the wheel structure 17 is connected, and the wire 20 extends through an aperture 32 in the wheel 17 and a registering aperture 33 in the head 31, and thence through the groove 21 to the conductor ring 22. The operation is the same as in Figures 1 and 2. It will be noted in Figure 3 that the roller bearings 17a are interposed between the wheel structure 17 and the outer end of the axle housing 13, which axle housing forms an inner bearing raceway, and the circuit is maintained to the conductor ring 22 through the bearing connection but not through either raceway per se, therefore there is no weight carried by the conductor ring 22 and its engaging parts.

Referring to Figure 4 wherein a rear axle structure of the Chevrolet type is shown, the rings 22 and 24 are disposed within the wheel hub 34 between the bearings 35, otherwise the structure and operation is the same as in the other forms. In this form the conductor wire 11 extends through a groove 36 in the outer periphery of the axle casing 13 and through the inner bearing 35. It will be seen that the connection is made through the conductor ring and through the inner bearing without using the bearing raceways for conductor purposes. In other words the bearing raceways are by-passed by the circuit.

Referring to Figure 5 wherein a front axle structure is shown of the stub axle type, the numeral 37 designates the stub axle which extends into the wheel hub 38 which carries the wheel 39. Disposed within the hub 38 are spaced bearings 40, and in this form the insulated connector 26 is carried by the hub and rotates therewith, and the stationary conductor ring 22 is mounted on the spindle 37. The conductor wire 11 is disposed in a groove 41 in the periphery of the stub axle and passes through the knuckle joint. This is conventional Ford structure. In this form the connection is maintained through the bearing 40 without utilizing its outer or inner raceway as a conductor means, that no load is carried by conductor rings.

Referring to Figures 6 and 7, in this form of rear axle and wheel structure of the Chevrolet type, the circuit maintaining device is mounted in an insulated annular casing 42 around the axle housing 43 in which the rear axle 44 rotates, and also mounted in said casing is a grease retaining packing 45 held in engagement with the outer periphery of the casing 43 by a contractible spring 46, and between flanges 47. It will be noted that the outer conductor ring 24 has its shaft 28 slidably mounted in an integral sleeve 48 carried by the casing 42, and the conductor wire 11 is connected directly to the ring 22 and extends inwardly over the casing 43. Disposed within the casing 42 is a guide lug 49 for supporting the ring 24 substantially axially during the assembling operation so it will be guided onto the inner conductor ring 22.

From the above it will be seen that a circuit maintaining device is provided in connection with vehicle wheels for maintaining a circuit through the bearing of the wheel but by-passing all raceways of the bearing and obviating the use of the bearing raceway as a conductor which would necessarily have to be insulated from other parts and carry a load which would not stand up in use. It will also be seen that a signaling means is provided for notifying or warning the operator of the vehicle that the tire is deflated or partially deflated, thereby allowing the operator to stop the vehicle and prevent a probable serious accident. Although the device has been shown in connection with a single wheel, it is obvious, by varying the circuit, it may be used in connection with the four wheels of the vehicle, or to a trailer if desired.

The invention having been set forth what is claimed as new and useful is:

1. A circuit maintaining device for vehicle wheels and axles comprising a stationary conductor ring carried by one of said members, a conductor ring entirely surrounding the first mentioned ring with its center to one side of the center of the first mentioned ring and carried by the other member and engaging one side of the periphery of the first mentioned ring, a shaft carried by the second mentioned ring, means for forcing said shaft towards the first mentioned ring, said rings and shaft being insulated from the parts on which they are mounted, one side of said first mentioned ring being bevelled.

2. A device as set forth in claim 1 wherein the second mentioned ring is disposed within a casing surrounding the first mentioned ring and forming a unit part thereof and a centering lug within said casing for centering said ring during the centering or assembling of the device on the first mentioned ring.

3. A circuit making device for vehicle wheels and axles comprising a stationary conductor ring carried by one of said members, a conductor ring entirely surrounding the first mentioned ring with its center to one side of the center of the first mentioned ring and carried by the other member and engaging one side of the periphery of the first mentioned ring, a shaft carried by the second mentioned ring, means for forcing said shaft towards the first mentioned ring, said rings and shaft being insulated from the parts on which they are mounted, an insulating sleeve within the first mentioned ring and a bevelled surface carried by one side of the first mentioned ring and the insulating sleeve at the same angle.

GEORGE G. GUTHRIE.